United States Patent [19]

Silander

[11] 4,438,549
[45] Mar. 27, 1984

[54] ARRANGEMENT OF FITTINGS FOR FLATS IN A CARDING MACHINE

[76] Inventor: Keijo Silander, Styrestagatan 8, SE 60229 Norrkoeping, Sweden

[21] Appl. No.: 339,248

[22] Filed: Jan. 13, 1982

[51] Int. Cl.³ .............................................. D01G 15/32
[52] U.S. Cl. ........................................ 19/107; 19/113; 19/200
[58] Field of Search .................. 19/107, 113, 200, 114

[56] References Cited

U.S. PATENT DOCUMENTS

| | | | |
|---|---|---|---|
| 3,136,005 | 6/1964 | Reiterer | 19/114 |
| 4,227,285 | 10/1980 | Hamrick | 19/107 |
| 4,309,796 | 1/1982 | Garrison et al. | 19/107 X |
| 4,314,387 | 2/1982 | Löffler | 19/107 X |

FOREIGN PATENT DOCUMENTS

| | | | |
|---|---|---|---|
| 2733421 | 1/1979 | Fed. Rep. of Germany | 19/107 |
| 2833413 | 2/1979 | Fed. Rep. of Germany | 19/107 |
| 1019768 | 2/1966 | United Kingdom | 19/107 |

*Primary Examiner*—Louis Rimrodt
*Attorney, Agent, or Firm*—Flynn, Thiel, Boutell & Tanis

[57] ABSTRACT

An arrangement of flat-fittings in a cotton carding machine for removing dust, husks and neps from cotton supplied to the carding cylinder fittings includes a gap extending the whole length of the flat-fittings, located in the middle portion of the surface of this fitting, facing towards the cylinder fitting, extending in a forward and outward direction with respect to the forward travel direction of the flat-fittings and in communication with free air via a dust-catching device. The dust-catching device includes a chamber which communicates with the gap and communicates with the free air through at least one opening which is covered by a filter.

14 Claims, 4 Drawing Figures

ARRANGEMENT OF FITTINGS FOR FLATS IN A CARDING MACHINE

FIELD OF THE INVENTION

This invention relates to a machine for carding and for removing contaminants such as dust, husks and neps from a fibrous material such as cotton.

BACKGROUND OF THE INVENTION

There has long been a need of rapidly removing dust, husks and neps from the cotton coming to the carding cylinder teeth of a carding machine, so that these contaminants do not disturb the carding process itself and do not wear the teeth on the cylinder or those on the flats, this need also extending to the prevention of the spread of these contaminants into the carding room.

The present invention relates to an arrangement which will satisfy all these needs.

SUMMARY OF THE INVENTION

In accordance with the invention, a carding machine is provided which has flat-fittings and has a gap in a central portion of a surface on the fittings which faces the carding cylinder fittings, the gap extending forwardly and outwardly and communicating with the free outer air via a dust collecting arrangement.

BRIEF DESCRIPTION OF THE DRAWINGS

The invention will now be described in detail while referring to the accompanying drawings, in which.

In the continued description, orientation is expressed in respect of the centre of the carding cylinder, and thus "inward" is radially towards the cylinder, "outward" the converse, "forward" in the direction of travel of the flats and "backward" the converse.

DETAILED DESCRIPTION

Figure 1:
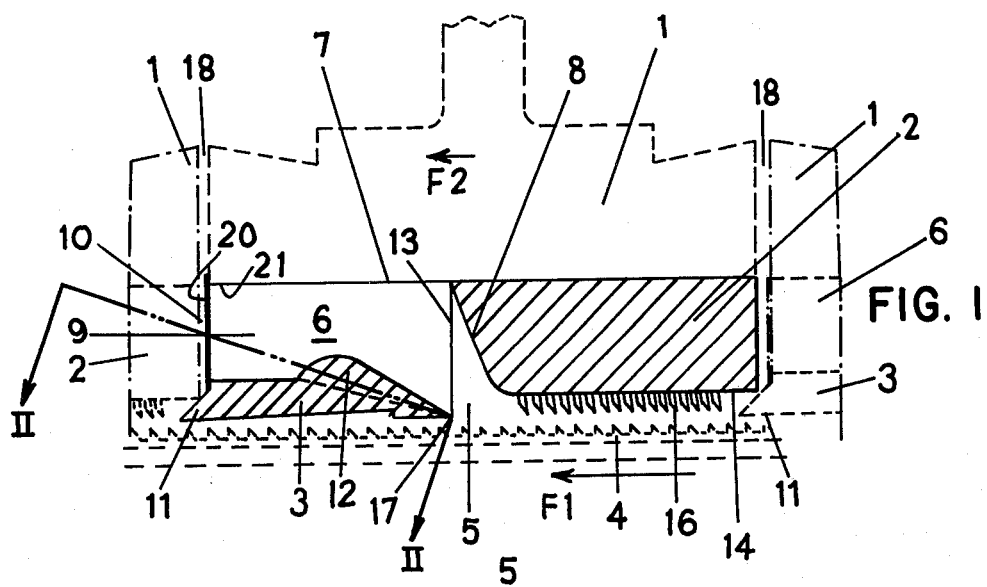
FIG. 1 is a cross section illustrating a flat in a carding machine which embodies the invention and is taken along the line I—I in FIG. 2.
Figure 2:
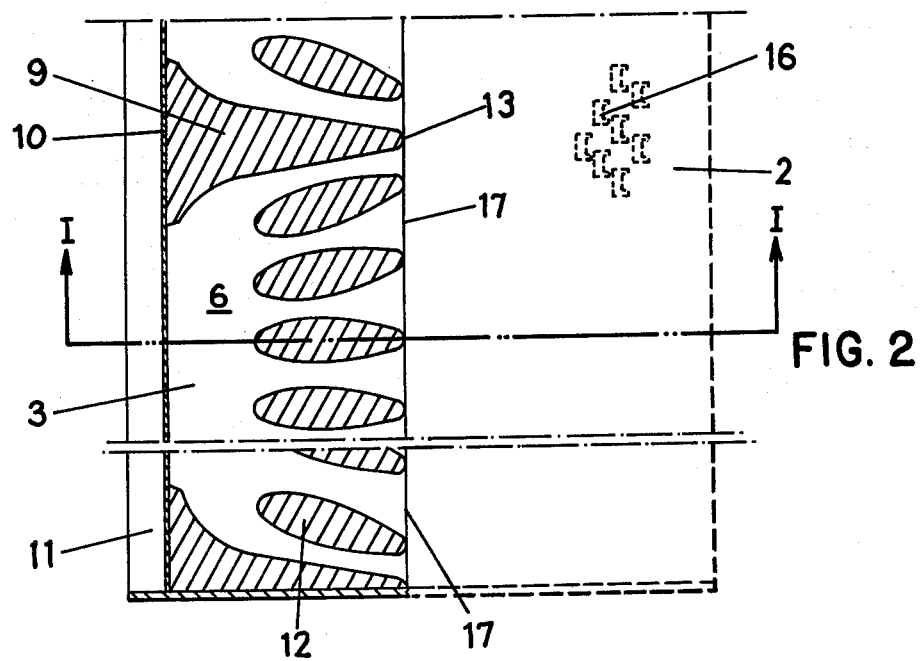
FIG. 2 is a sectional view which illustrates an end portion of the flat and is taken along the line II—II in FIG. 1.
Figure 3:
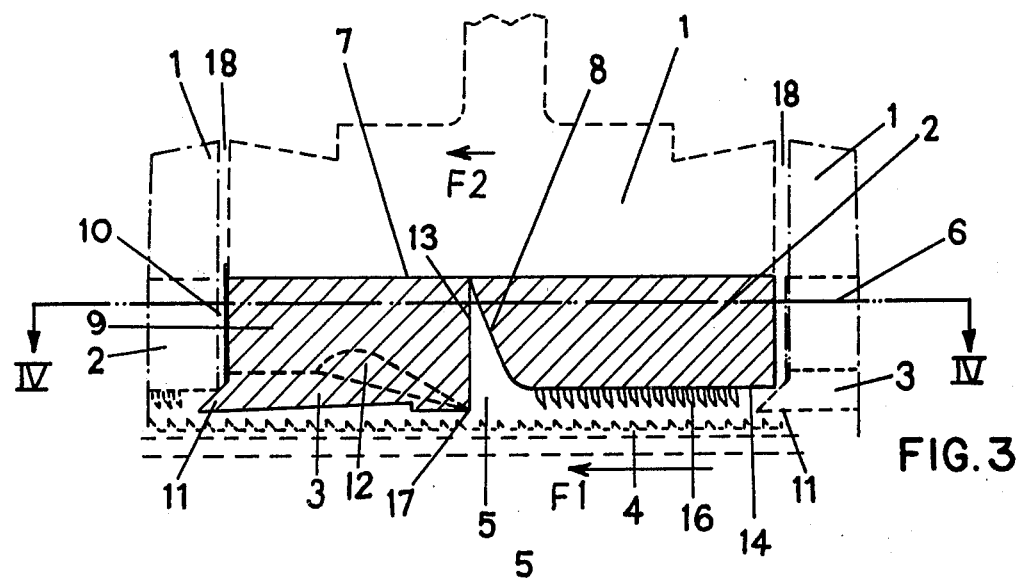
FIG. 3 illustrates a cross-section similar to FIG. 1 but taken along the line III—III in FIG. 4.
Figure 4:
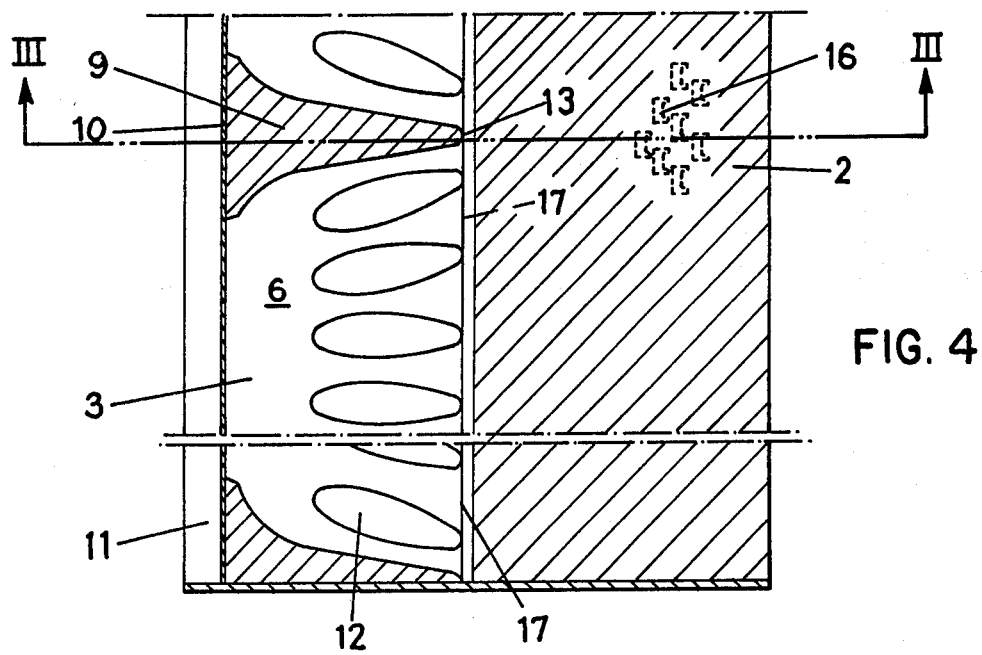
FIG. 4 illustrates a cross-section taken along the line IV—IV in FIG. 3.

On arrangement, in the form of fittings 2,3 for attachment, eg by glueing, to a plurality of flats, is illustrated in FIG. 1 by showing the fittings on one flat. The fittings are in two parts for each flat, the backward or rear fitting part 2 being conventionally provided with carding teeth 16. The forward face 8 of this part slopes forward and outward. The forward or front fitting part 3 is formed as a plate with its rear portion converging to a point knife edge 17 at a location spaced from the forward face 8 of the part 2, thus forming a slot or gap or opening 5 between them. The edge 17 is relatively close to the tips of carding teeth of the cylinder fittings 4. At its forward edge, the plate 3 is formed with a transversely extending bevelled portion or lip 11 adapted for abutting against the inner rear edge of the fitting part 2 on the preceding flat.

The plate 3 is provided with outwardly projecting spacer protuberances or supports 9, arranged to be glued by their flat outer sides onto the inwardly facing surface 7 of the flat slat 1. The protuberances 9 flare in thickness in a direction forwardly from their rear edges 13, which are rounded, and have flat forward faces situated in the same plane as the forward side of the flat slat 1. A filter 10 is glued to the front surface 20 defined by the forward faces of the protuberances 9, plate 3 and slat 1, and covers an opening 21 provided in the surface 20. The regions between the protuberances 9, slat 1 and plate 3 serve as chambers or extensions 6 which communicate the gap 5 and openings 21. The chamber 6 is, in effect, a portion of a passageway through the flat which provides communication between the slot 5 and the openings 21. The rear portion of the outward side of the plate 3 is provided with elongate rounded peaks or convex projections 12, of which the ones situated nearest the protuberances 9 are arranged to converge in a direction toward the filter 10. The filter 10 can suitably be an extremely fine mesh net, a strip of fibre felt or a strip of foamed plastic material with open pores.

The arrangement functions in the following way.

Since the cylinder rotates with a comparatively large peripheral speed F2 in the forward direction, the carding teeth of the cylinder fittings 4 will entrain the air situated between them so that it is given a tangential movement forwardly and outwardly. When this air meets the front edge 17 of the slot 5, which is travelling in the same direction at a substantially slower rate F2, it will be forced into the slot 5, where it is caused by the peaks 12 to move in a substantially laminar manner out through the filter 10, leaving behind husks, neps and dust in the extension 6, while the air departs through the gap or space 18 between the fitting 3 and a preceding fitting 2. The lip 11 prevents dust-contaminated air from departing through the gap 18 and flowing out into the carding room where it could give rise to hygienic problems.

When the flat slat 1 comes to the forward turning point of the belt or web of the flats, the openings of the gaps 5 are connected to a source of heavy vacuum (not shown) which sucks the chamber 6 and filter 10 clean so that the arrangement is ready to function once again when it comes to the rear turning point of the slat web.

The embodiments of the invention in which an exclusive property or privilege is claimed are defined as follows:

1. A carding machine for carding and for removing contaminants from a fibrous material, comprising a rotatably supported carding cylinder rotationally driven in a forward direction at a first speed and having first carding means on the peripheral surface thereof, a flat supported adjacent the peripheral surface of said carding cylinder for movement in said forward direction at a second speed less than said first speed and having second carding means on a first surface thereof which faces said carding cylinder, means defining a first opening in said first surface of said flat, a second surface provided on said flat and having a second opening therein, said second opening communicating with the ambient air surrounding said carding machine, means defining a passageway through said flat which communicates with said first opening and with said second opening, said passageway extending away from said first opening at least partly in said forward direction, and means on said flat defining a filter at a location remote from said first opening for filtering the air flowing through said passageway, said first carding means, in response to rotation of said carding cylinder at said first speed, entraining air situated between said carding cylinder and said flat and causing it to flow in said forward direction and into said first opening and said passageway and through said filter, contaminants from said fibrous material being carried by said air flow into said passageway, being filtered from said air flow by said filter and being thus retained in said passageway in said flat.

2. The carding machine of claim 1, wherein said first opening is a slot which extends approximately transversely of said first direction, and wherein said passageway includes means defining a chamber in the region of said filter, said filter being located downstream of said chamber.

3. The carding machine of claim 2, wherein said flat includes front and rear fitting portions disposed on opposite sides of and defining said slot and having said first surface thereon, said flat having a third surface thereon which faces said carding cylinder, said front fitting portion including a plate portion which is spaced radially inwardly from said second surface and including two axially spaced and approximately radially extending supports which extend between said third surface and said plate portion, the region between said supports, said plate portion and second surface being said passageway and said chamber.

4. The carding machine of claim 3, wherein the thickness of said supports increases progressively in said forward direction.

5. The carding machine of claim 3, including guide means in said passageway for guiding the flow of air therethrough, said guide means including a plurality of radially outward, axially spaced concave projections located between said supports on a radially outwardly facing surface of said plate portion.

6. The carding machine of claim 5, wherein said concave projections are elongate and the axially outermost of said convex projections converge in said forward direction.

7. The carding machine of claim 3, wherein said rear fitting portion has a front surface which is inclined forwardly and outwardly, and wherein the rear portion of said plate portion of said flat converges rearwardly to a pointed edge extending approximately transversely of said forward direction.

8. The carding machine of claim 3, wherein said first carding means includes a plurality of carding teeth provided on the peripheral surface of said cylinder, and wherein said second carding means includes a plurality of carding teeth provided on said second fitting portion of said flat.

9. The carding machine of claim 2, wherein said filter includes a very fine mesh net.

10. The carding machine of claim 2, wherein said filter includes a sheet of a fiber felt material.

11. The carding machine of claim 2, wherein said filter includes a sheet of foamed plastic material having small, open pores.

12. The carding machine of claim 1, including a plurality of said flats positioned at circumferentially spaced locations along the peripheral surface of said carding cylinder, each said flat being spaced slightly from the flats which are adjacent thereto, and including a forwardly projecting lip which is provided on the front of each said flat, extends axially, and engages an adjacent flat, thereby minimizing the flow of air and contaminants through the spaces between said flats.

13. The carding machine of claim 12, wherein said second surface of each said flat faces forwardly and communicates with the space between such flat and an adjacent said flat, said lip being located radially inward of said second opening in said second surface, whereby air flowing through said passageway and filter in each said flat flows out into the space between such flat and an adjacent flat.

14. The carding machine of claim 13, wherein said filter includes a sheet of filter material adhesively secured to said second surface of said flat and extending across said second opening therein.

* * * * *